United States Patent
Vrind et al.

(10) Patent No.: US 9,967,695 B2
(45) Date of Patent: May 8, 2018

(54) METHOD AND APPARATUS FOR TRANSMITTING AND RECEIVING DATA BY MACHINE TYPE COMMUNICATION TERMINAL IN WIRELESS COMMUNICATION SYSTEM

(71) Applicant: Samsung Electronics Co., Ltd., Suwon-si, Gyeonggi-do (KR)

(72) Inventors: Tushar Vrind, Suwon-si (KR); Diwakar Sharma, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 220 days.

(21) Appl. No.: 14/881,545

(22) Filed: Oct. 13, 2015

(65) Prior Publication Data

US 2016/0112823 A1    Apr. 21, 2016

(30) Foreign Application Priority Data

Oct. 16, 2014   (KR) .................. 10-2014-0139848

(51) Int. Cl.
*H04W 4/70*  (2018.01)
*H04W 4/00*  (2018.01)
*H04W 28/06* (2009.01)
*H04L 29/06* (2006.01)

(52) U.S. Cl.
CPC ............ *H04W 4/005* (2013.01); *H04W 4/70* (2018.02); *H04W 76/27* (2018.02); *H04L 69/04* (2013.01); *H04W 28/06* (2013.01)

(58) Field of Classification Search
None
See application file for complete search history.

(56) References Cited

U.S. PATENT DOCUMENTS

| 2005/0083934 | A1  | 4/2005  | Tan et al. |
| 2009/0238129 | A1* | 9/2009  | Park ............... H04W 76/041 370/329 |
| 2014/0341075 | A1* | 11/2014 | Hans ............... H04W 28/06 370/254 |
| 2015/0326695 | A1* | 11/2015 | Pang ............... H04L 69/04 370/477 |

FOREIGN PATENT DOCUMENTS

WO    2004/015957 A1    2/2004

* cited by examiner

*Primary Examiner* — Edan Orgad
*Assistant Examiner* — Saumit Shah
(74) *Attorney, Agent, or Firm* — Jefferson IP Law, LLP

(57) ABSTRACT

A long term evolution (LTE) protocol and a technology for designing an entity of the LTE protocol in layer 2 are provided. The method includes receiving a control message including packet data convergence protocol (PDCP) configuration information from an external communication device, determining whether data of a PDCP protocol data unit (PDU) received by the communication device is compressed according to the received PDCP configuration information, and when the data is compressed based on a result of the determination, decompressing the data.

18 Claims, 13 Drawing Sheets

FIG. 12

```
-- ASN1START

PDCP-Config ::=              SEQUENCE {
    discardTimer                 ENUMERATED {
                                     ms50, ms100, ms150, ms300, ms500,
                                     ms70, ms1500, infinity
    }                                                         OPTIONAL,        --Cond Setup
    rlc-AM                       SEQUENCE {
        statusReportRequired         BOOLEAN
    }                                                         OPTIONAL,        --Cond Rlc-AM
    rlc-UM                       SEQUENCE {
        pdcp-SN-Size                 ENUMERATED  {len7bits, len12bits}
    }                                                         OPTIONAL,        --Cond Rlc-UM
    headerCompression            CHOICE {
        notUsed                      NULL,
        rohc                         SEQUENCE {
            maxCID                       INTERGER (1..16383)             DEFAULT 15,
            profiles                     SEQUENCE {
                profile0x0001                BOOLEAN ,
                profile0x0002                BOOLEAN ,
                profile0x0003                BOOLEAN ,
                profile0x0004                BOOLEAN ,
                profile0x0006                BOOLEAN ,
                profile0x0101                BOOLEAN ,
                profile0x0102                BOOLEAN ,
                profile0x0103                BOOLEAN ,
                profile0x0104                BOOLEAN
            },
            ...
        }
    },
    dataCompression              CHOICE {
        notUsed                      NULL,
        compression                  SEQUENCE {
            ID                           INTERGER (1..16383)             DEFAULT 15,
            profiles                     SEQUENCE {
                profile0x0001                BOOLEAN ,
                profile0x0002                BOOLEAN ,
                ...
            },
            ...
        }
    }
},
...,
[[ rn-IntegrityProtection-r10   ENUMERATED {enabled}         OPTIONAL        --Cond RN
]],
[[ pdcp-SN-Size-v1130           ENUMERATED {len15bits}       OPTIONAL        --Cond Rlc-AM2
]]
}
```

METHOD AND APPARATUS FOR TRANSMITTING AND RECEIVING DATA BY MACHINE TYPE COMMUNICATION TERMINAL IN WIRELESS COMMUNICATION SYSTEM

CROSS-REFERENCE TO RELATED APPLICATION(S)

This application claims the benefit under 35 U.S.C. § 119(a) of Korean patent application filed on Oct. 16, 2014 in the Korean Intellectual Property Office and assigned Serial number 10-2014-0139848, the entire disclosure of which is hereby incorporated by reference.

TECHNICAL FIELD

The present disclosure relates to a long term evolution (LTE) protocol. More particularly, the present disclosure relates to a technology for designing an entity of an LTE protocol in Layer 2.

BACKGROUND

Machine type communication (MTC) or machine to machine communication (M2M) (hereinafter, referred to as "MTC") may refer to a data communication type related to one or more entities which does not necessarily require human intervention. The MTC includes a plurality of wireless communication means such as a wireless local area network (WLAN) and a third generation (3G)/fourth generation (4G) communication network with respect to a wireless terminal, and corresponds to a technology of providing an information service to a mobile wireless terminal from a service server through the wireless communication means. In the MCT, since a wireless terminal of a user who receives service for a plurality of wireless communication devices has mobility, technologies for selective access and successive services between a service server and the wireless mobile terminal have been developed.

Particularly, an MTC service using mobile communication is currently performed. More specifically, services for telematic, security, automatic meter reading (AMR), payment, remote maintenance and control (RMC), health, consumer devices, and the like have gradually increased and utilization ranges thereof have gradually expanded.

In the 3$^{rd}$ Generation Partnership Project (3GPP), as characteristics different from those of the human-oriented communication service, the MTC service has low mobility, time controlled data transmission/reception only for a predetermined time, delay tolerance of data transmission (time tolerant), priority alarm message transmission, packet switched only service, and small data transmission rate according to the related art.

In general, MTC UEs used in a cellular network have a low performance or capability compared to normal cellular communication user equipment (UEs) such as smart phones or the like. According to an operation type of the UE, the UE may be largely divided into a UE for human type communication (HTC) and a UE for MTC. The HTC may mean that transmission of a signal is determined by the human and the signal is transmitted/received, and the MTC means that each UE transmits a signal periodically or by generation of an event by itself without human intervention.

The number of MTC UEs has gradually increased and, in this case, signaling and traffic overhead problems which should be handled by MTC communication may occur. Recently, discussions on an optimized radio access network (RAN) for an MTC communication system are increasing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of reducing signaling or traffic overhead according to an increase in the number of user equipments (UEs) in a communication device. Further, the present disclosure proposes a design of layer 2 which may be more suitable for a machine type communication (MTC) communication scheme.

In accordance with an aspect of the present disclosure, a method of receiving data by a communication device in a wireless communication system is provided. The method includes receiving a control message including packet data convergence protocol (PDCP) configuration information from an external communication device, determining whether data of a PDCP protocol data unit (PDU) received by the communication device is compressed according to the received PDCP configuration information, and when the data is compressed based on a result of the determination, decompressing the data.

In accordance with another aspect of the present disclosure, a method of transmitting data by a communication device in a wireless communication system is provided. The method includes determining data compression of a PDCP PDU of data to be transmitted, compressing the data of the PDCP PDU according to a preset compression algorithm, and transmitting the compressed data to an external communication device.

In accordance with another aspect of the present disclosure, an apparatus for transmitting and receiving data in a wireless communication system is provided. The apparatus includes a communication unit configured to perform data communication, and a controller configured to receive a control message including PDCP configuration information from an external communication device, determine whether data of a PDCP PDU received by the communication device is compressed according to the received PDCP configuration information, and, when the data is compressed based on a result of the determination, decompress the data.

In accordance with another aspect of the present disclosure, an apparatus for transmitting and receiving data in a wireless communication system is provided. The apparatus includes a communication unit configured to perform data communication, and a controller configured to determine data compression of a PDCP PDU of data to be transmitted, compress the data of the PDCP PDU according to a preset compression algorithm, and transmit the compressed data to an external communication device.

According to various embodiments of the present disclosure, even though the number of UEs increases in an MTC communication scheme, it is possible to resolve signaling and traffic overhead.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 illustrates PDCP configuration information included in a control message in a data transmission/reception method according to an embodiment of the present disclosure.

Throughout the drawings, like reference numerals will be understood to refer to like parts, components, and structures.

DETAILED DESCRIPTION

Figure 1:
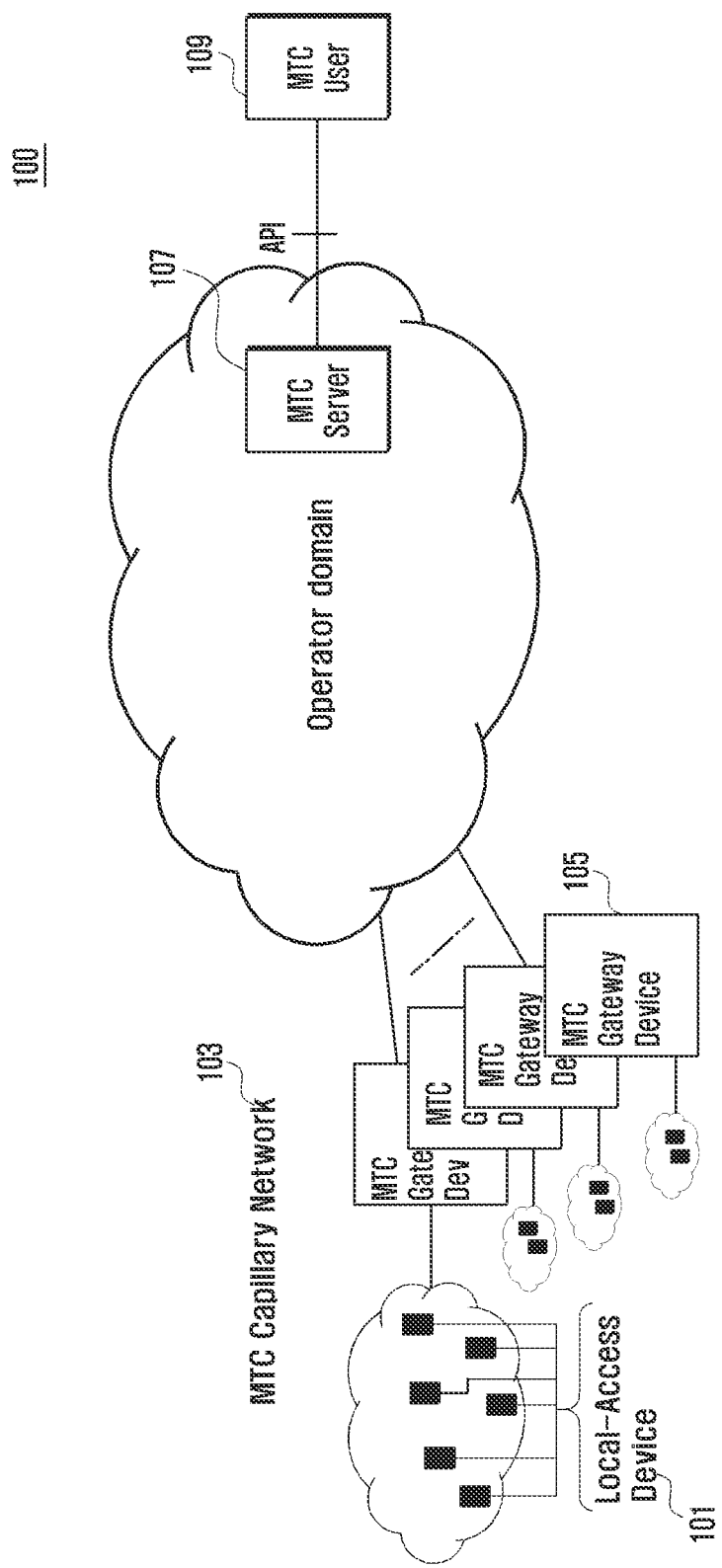
FIG. 1 illustrates an example of a configuration of a machine type communication (MTC) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The specific terms used herein are provided for ease of understanding the present disclosure, and such specific terms may be changed into other forms without departing from the spirit and scope of the present disclosure.

In the descriptions of the embodiments of the present disclosure, a long term evolution (LTE) system of 3rd generation partnership project (3GPP) or an LTE-advanced (LTE-A) communication system that supports the coupling of carrier waves are mainly described. However, the subject matter of the present disclosure will be applicable to other communication systems having a similar technical background and channel form through slight modifications made within the scope that are not apart from the present disclosure, and the modifications can be made by those skilled in the field of the present disclosure.

In the present specification, a local access device may refer to a device that is not directly connected to a cellular network but is connected to a network gateway in a scheme such as wireless local area network (WLAN), ZIGBEE™, BLUETOOTH™, or the like.

In the present specification, a machine type communication (MTC) device may collectively refer to devices having a function of directly connecting to the cellular network. The MTC device may be connected to not only the cellular network but also to a local network. Further, although the present disclosure may be described mainly based on the MTC device in terms of effect, devices to which the present disclosure can be applied are not limited only to the MTC device but may be applied to all communication devices having a communication function.

In an LTE protocol according to the present specification, the terms entity or layer may be interchangeably used.

FIG. 1 illustrates an example of a configuration of an MTC system according to an embodiment of the present disclosure.

Referring to FIG. 1, an MTC system 100 is configured based on an MTC server (107) which is included in an operator domain and provides an MTC service.

That is, in FIG. 1, one or more devices may constitute an MTC capillary network 103, and the MTC capillary network 103 may be configured based on the MTC server 107 which provides the MTC service. An MTC user 109 may access the MTC server 107 by using an application program interface (API).

Here, the devices may be local access devices 101. The local access device 101 does not have a cellular network communication function, and each of MTC gateway devices 105 may be connected to the local access device 101 through a local connection scheme, for example, Institute of Electrical and Electronics Engineers (IEEE) 802.15, ZIGBEE, BLUETOOTH, or the like.

Further, the MTC gateway device 105 may be connected to the operator domain 107 through the cellular network. The local access devices 101 may constitute the MTC capillary network 103 based on the accessed MTC gateway device 105, and perform a service for the local access device 101 through the MTC capillary network 103. As a representative example, the MTC capillary network 103 may include a short range wireless network such as WLAN, and the local access devices 101 may include WLAN access point devices. Further, a representative example of the operator domain 107 may be a 3G/4G communication network.

Figure 2:
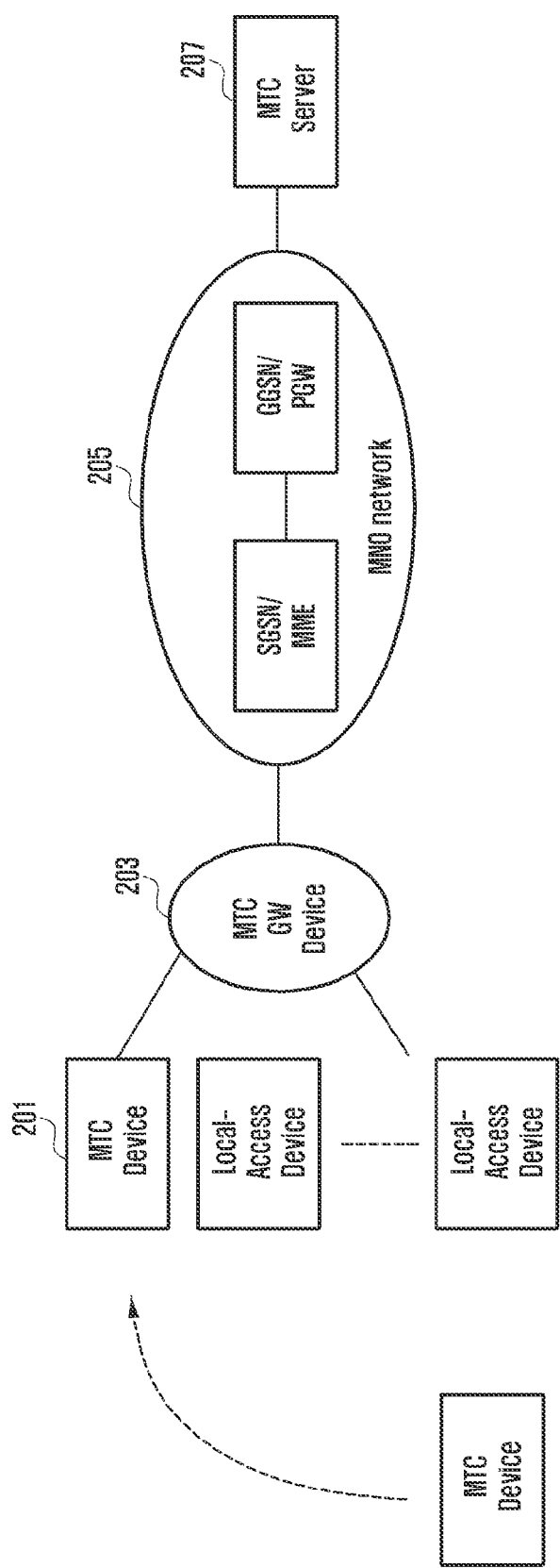
FIG. 2 illustrates another example of the configuration of the MTC system according to an embodiment of the present disclosure.

FIG. 2 illustrates another example of the configuration of the MTC system according to an embodiment of the present disclosure.

The MTC system of FIG. 2 is similar to the MTC system of FIG. 1 in that one or more devices constitute the MTC capillary network. Referring to FIG. 2, the devices may be MTC devices 201, which can access a 3GPP wireless communication network, that is, MTC devices 201 having the cellular network function as well as the local access devices. Further, the local access device of FIG. 1 and the MTC device 201 may form the MTC capillary network together. In this case, the local access device may be connected to an MTC gateway device 203 through a local access scheme. That is, the MTC gateway device 203 may be connected to the local access device through a local connection scheme, for example, IEEE 802.15, ZIGBEE, BLUETOOTH, or the like. An MTC device 201 can access an MTC server 207 via a mobile network operator (MNO) network 205.

Further, the MTC devices 201 may perform direct communication with the network by using a cellular network connection and may be connected to the network through the MTC gateway device 203.

In addition, although not illustrated in FIG. 2, the MTC devices 201 may be connected to the MTC gateway device by using an LTE-DIRECT or device to device (D2D) communication scheme according to another embodiment of the present disclosure.

Figure 3:
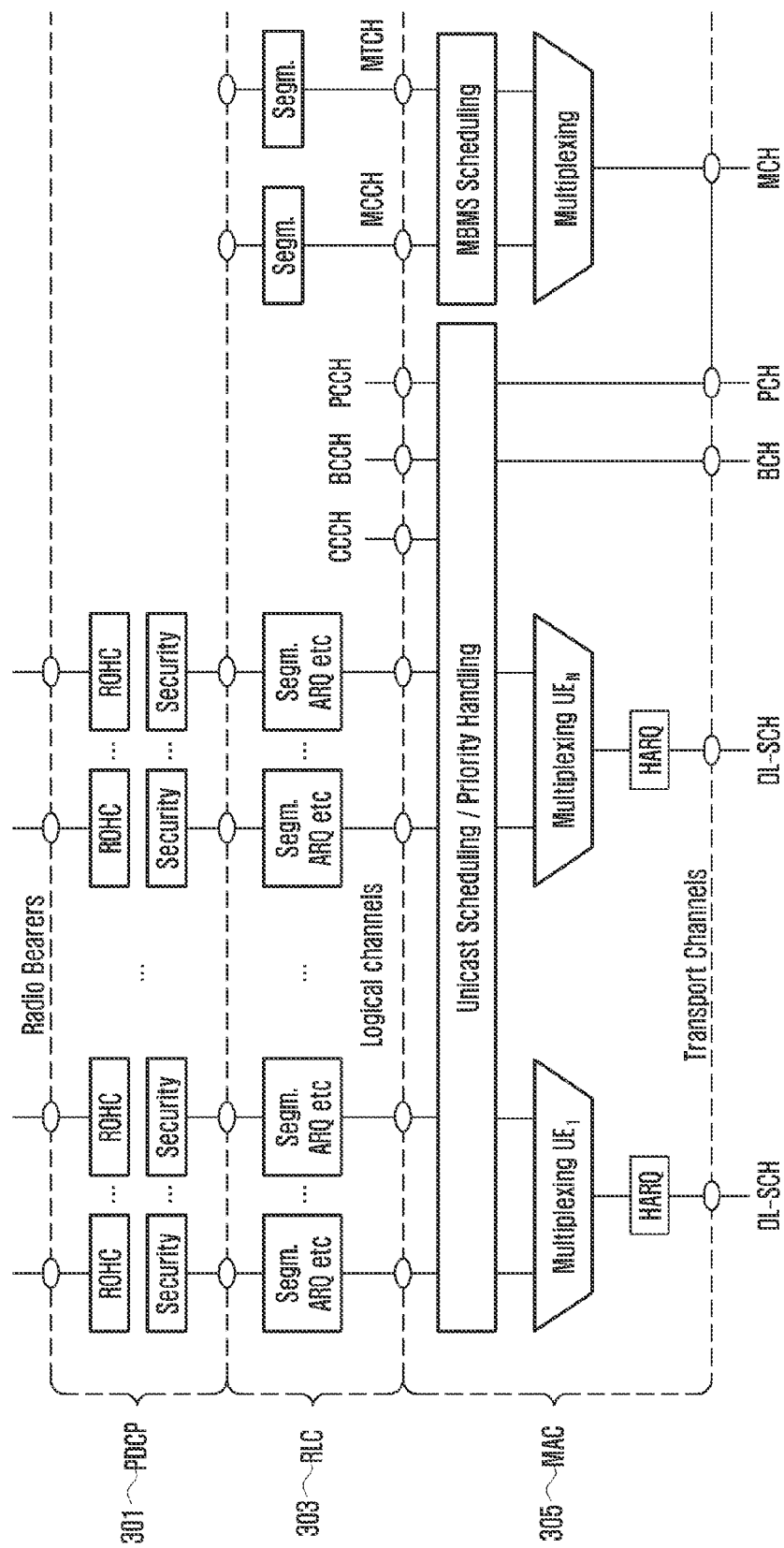
FIG. 3 illustrates a part of a downlink long term evolution (LTE) protocol according to an embodiment of the present disclosure.

FIG. 3 illustrates a part of a downlink LTE protocol according to an embodiment of the present disclosure.

Referring to FIG. 3, data to be transmitted in downlink may enter a processing process in the form of an Internet protocol (IP) packet above a system architecture evolution (SAE) bearer. The IP packets having entered the processing process pass through various protocol entities before they are transmitted through a wireless interface.

A packet data convergence protocol (PDCP) 301 performs IP header compression to reduce the number of bits transmitted over the wireless interface. A header compression scheme may be based on robust header compression (ROHC) corresponding to a standardized header compression algorithm used in other mobile communication standards. Further, the PDCP 301 serves to encipher and protect integrity for transmitted data.

A protocol of the PDCP 301 in a receiving side performs a process of deciphering and decompressing corresponding thereto. The PDCP 301 may have one PDCP entity per SAE bearer.

A radio link control (RLC) 303 serves to perform segmentation/concatenation, retransmission management, and sequential transmission of data to higher layers. Unlike wideband code division multiple access WCDMA, an LTE wireless access network structure has only a single node, so that an RLC protocol is also located in an evolved node B (eNodeB). The RLC 303 provides a service to the PDCP 301 in the form of a radio bearer. The RLC 303 may have one RLC entity per radio bearer.

Specifically, a layer of the RLC 303 may serve to reconfigure data received from the PDCP layer 301 to be the size designated by a layer of the media access control (MAC) 305 (segmentation/concatenation), to reconstruct transmission failure generated in a lower layer through retransmission, and to perform re-ordering due to an hybrid automatic repeat request (HARQ) operation of the layer of the MAC 305.

The MAC 305 may handle HARQ retransmission and uplink and downlink scheduling. A scheduling function is located in the eNodeB (or eNB) and the eNodeB may have one entity of the MAC 305 per cell for uplink and downlink. An HARQ protocol part may exist both in a transmitting side and a receiving side of a protocol of the MAC 305. The MAC 305 may provide a service to the RLC in the form of a logical channel.

Specifically, the layer of MAC 305 is a layer located bottommost in layer 2. The layer of the MAC 305 is connected to a physical (PHY) layer through a transport channel and connected to the layer of the RLC 303 through a logical channel, thereby performing multiplexing between the logical channel and the transport channel. During such a process, the entity of the MAC 305 determines priorities of configured logical channels and an amount of data which can be transmitted by each logical channel. Further, the entity of the MAC 305 performs a radio resource allocation (scheduling request) procedure to allow the eNB to properly allocate radio resources to each UE.

Figure 4:
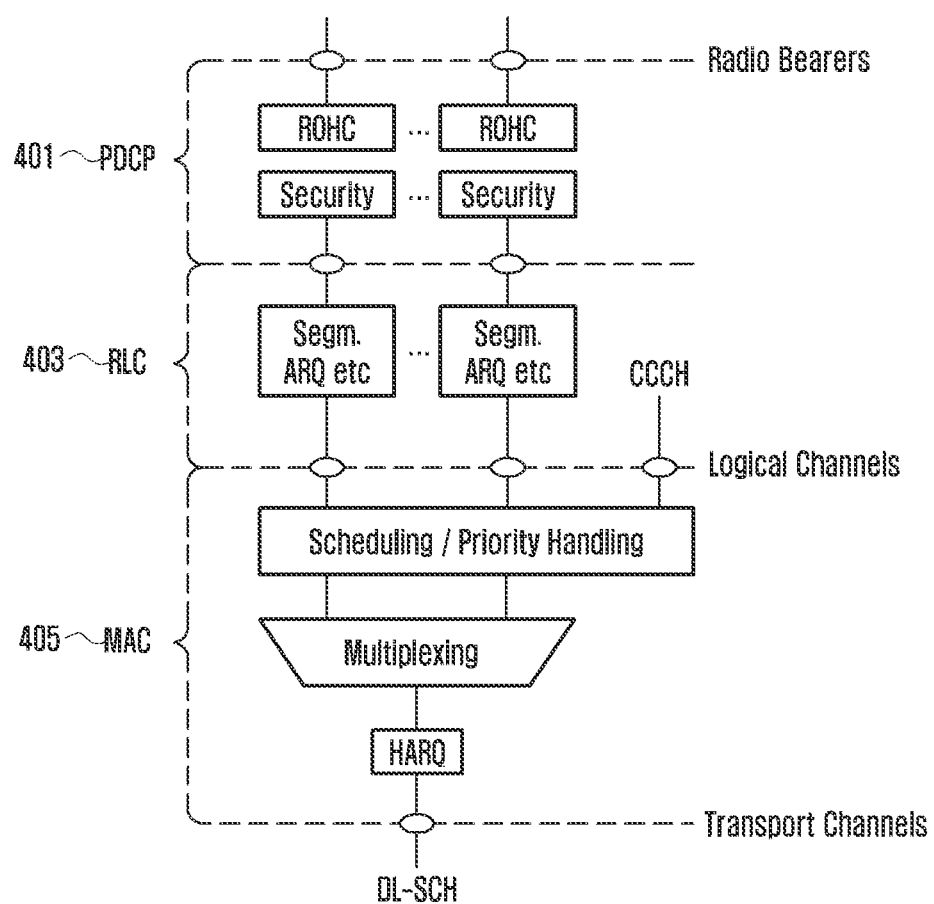
FIG. 4 illustrates a part of an uplink LTE protocol according to an embodiment of the present disclosure.

FIG. 4 illustrates a part of an uplink LTE protocol according to an embodiment of the present disclosure.

Referring to FIG. 4, an uplink protocol of the LTE protocol is very similar to the downlink described in FIG. 3. That is, although they have some differences in transport format selection or multi-antenna transmission, an LTE protocol structure related to uplink transmission corresponds to a downlink structure, which is identical to the description of FIG. 3 in the present specification. PDCP 401, RLC 403, and MAC 405 are substantially similar to the corresponding elements of FIG. 3, and a description thereof will not be repeated.

Figure 5:
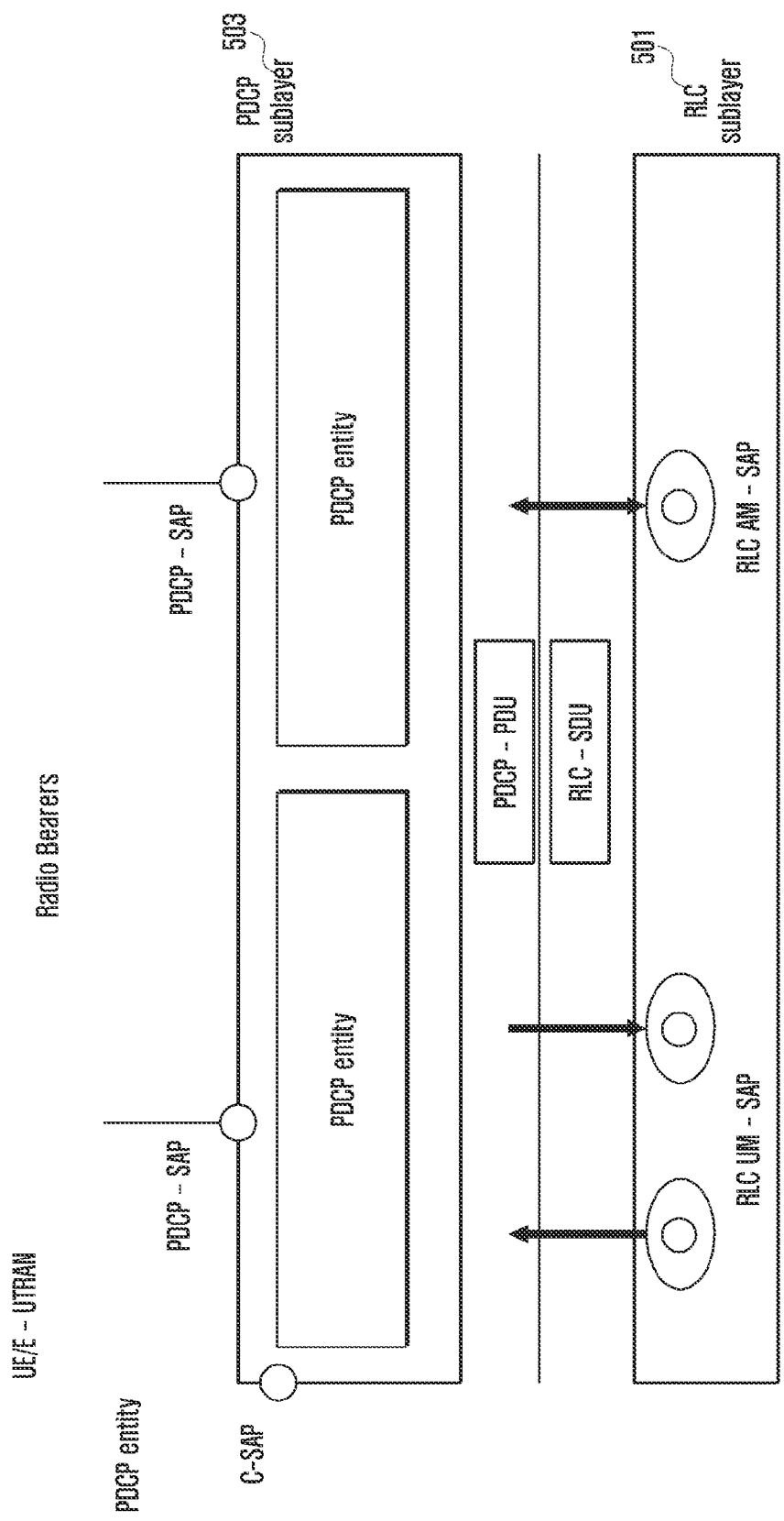
FIG. 5 illustrates a data transmission process between a packet data convergence protocol (PDCP) layer and an radio link control (RLC) layer according to an embodiment of the present disclosure.

FIG. 5 illustrates a data transmission process between a PDCP layer and an RLC layer according to an embodiment of the present disclosure.

In general, a data entity from or to a higher protocol layer is referred to as a service data unit (SDU) and a data entity to or from a lower protocol layer is referred to as a PDU.

Meanwhile, an RLC sublayer 501 of the LTE system may operate as one of a transparent mode (TM), an unacknowledged mode (UM), and an acknowledged mode (AM) like the universal mobile telecommunications system (UMTS) system.

A TM RLC entity may be set to be unidirectional transmission, and set as a transmitting side TM entity or a receiving side TM entity. In the TM mode, a header is not added to the RLC PDU.

A UM RLC entity is also set to be unidirectional transmission, and set as a transmitting side UM entity or a receiving side UM entity. The UM RLC entity is mainly used for transmission of a service having a characteristic which is sensitive to a transmission delay and insensitive to a little data loss like a streaming or voice service. Particularly, in the UM mode, the RLC PDU has a very brief header and is mainly used for the purpose of re-arrangement.

An AM RLC entity is set to be bidirectional transmission, and has a characteristic of no data loss transmission. Accordingly, in order to handle a data loss, which may be generated in a higher layer, an automatic repeat request (ARQ) mechanism may be used. The AM RLC entity may be used for a service having a characteristic requiring transmission having no error, for example, data transmission of a signaling radio bearer (SRB) or transmission control protocol (TCP) type.

The UM and TM RLC entities in LTE have little difference from the UM and TM RLC entities of UMTS, but the AM RLC entity has a slight difference due to addition of a re-segmentation function.

A PDCP sublayer 503 may perform a header compression function, a security function such as ciphering or integrity check, selective transmission function for increasing efficiency of wireless or wired resources in a handover, and the like.

Figure 6:
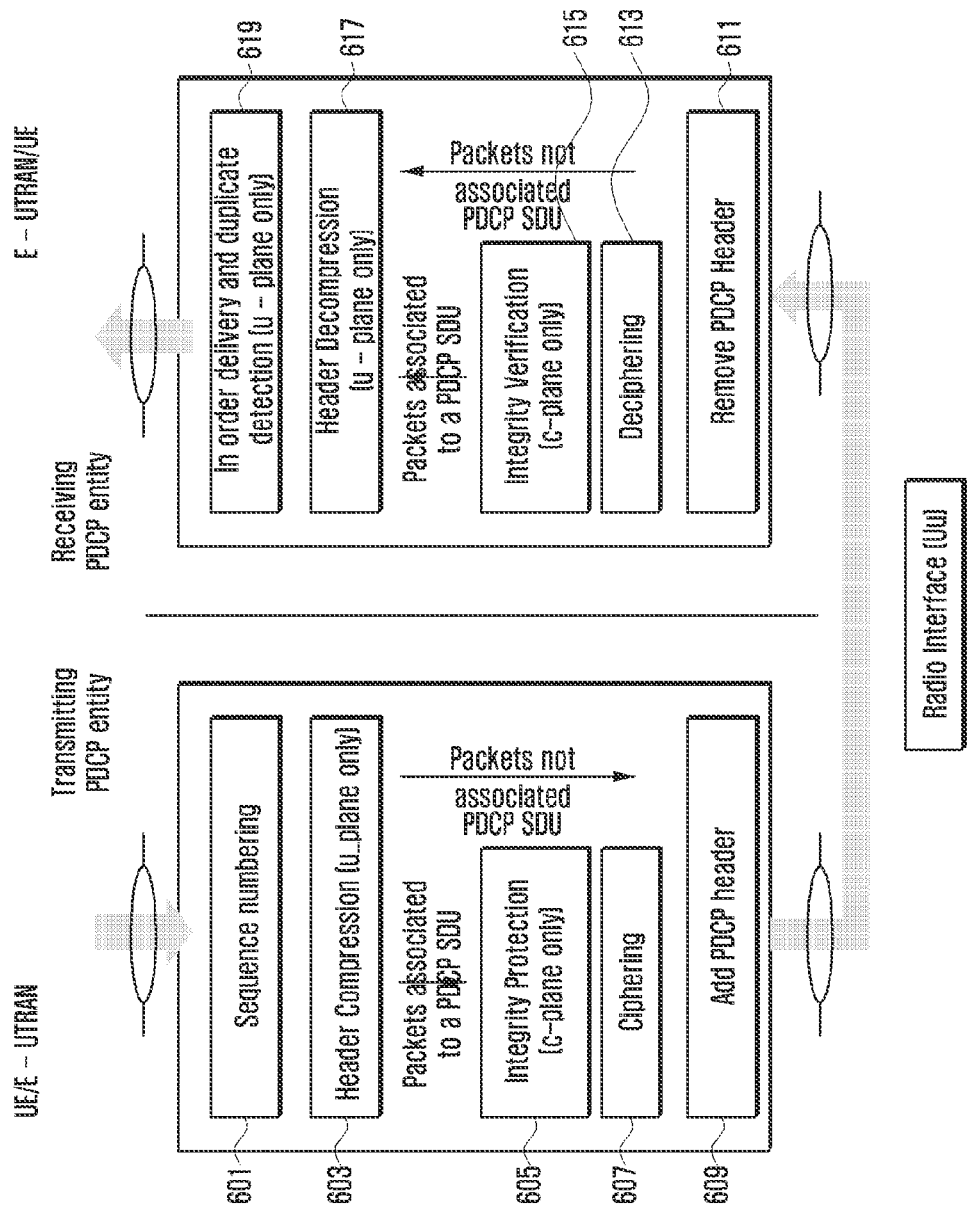
FIG. 6 illustrates a data flow in the PDCP entity according to the related art.

FIG. 6 illustrates a data flow in the PDCP entity according to the related art.

Although it is assumed that data transmission is performed from an eNB or evolved universal mobile telecommunications system terrestrial radio access network (E-UTRAN) to a UE for convenience in FIG. 6, the same process may be executed when the data transmission is performed inversely from the UE to the eNB or E-UTRAN.

First, the PDCP performs sequence numbering on data to be transmitted in operation 601. Then, the PDCP may selectively perform IP header compression in operation 603. The header compression may be based on ROHC. After the header compression, the PDCP performs integrity protection only for a control plane in operation 605. More specifically, a packet associated with the PDCP SDU may perform the integrity protection, and a packet, which is not associated with the PDCP SDU, may not pass through the integrity protection process.

In operation 607, the PDCP enciphers the data packet. In operation 609, after a PDCP header containing information required for deciphering by the UE is added, an output of the PDCP is input into the RLC.

Although not illustrated in FIG. 6, the following data flow is described below.

The RLC protocol performs segmentation and/or concatenation of the PDCP SDU and, subsequently, adds the RLC header. The header is used for identifying the RLC PDU when the UE performs data transmission and re-transmission according to the order. RLC PDUs are transmitted to a MAC layer, and several RLC PDUs are combined into one MAC SDU and then the MAC header is added to form a transport block. The size of the transport block may vary depending on an instantaneous data rate selected by link adaptation. Lastly, a PHY layer adds a cyclic redundancy check (CRC) to the transport block for the purpose of error detection, performs coding and modulation, and then transmits a final signal.

The UE having received the transport block inversely performs the above described process. More specifically, the output of the RLC of the reception UE is input into the PDCP. The PDCP removes the PDCP header in operation 611. Further, the PDCP may perform deciphering and integrity verification in operations 613 and 615. Like the transmitting side PDCP layer, packets, which are not associated with the PDCP SDU, may directly perform a header decompression operation without performing the integrity verification operation in operation 617. Thereafter, the PDCP may perform duplicate detection of lower layer SDUs in operation 619.

Figure 7:
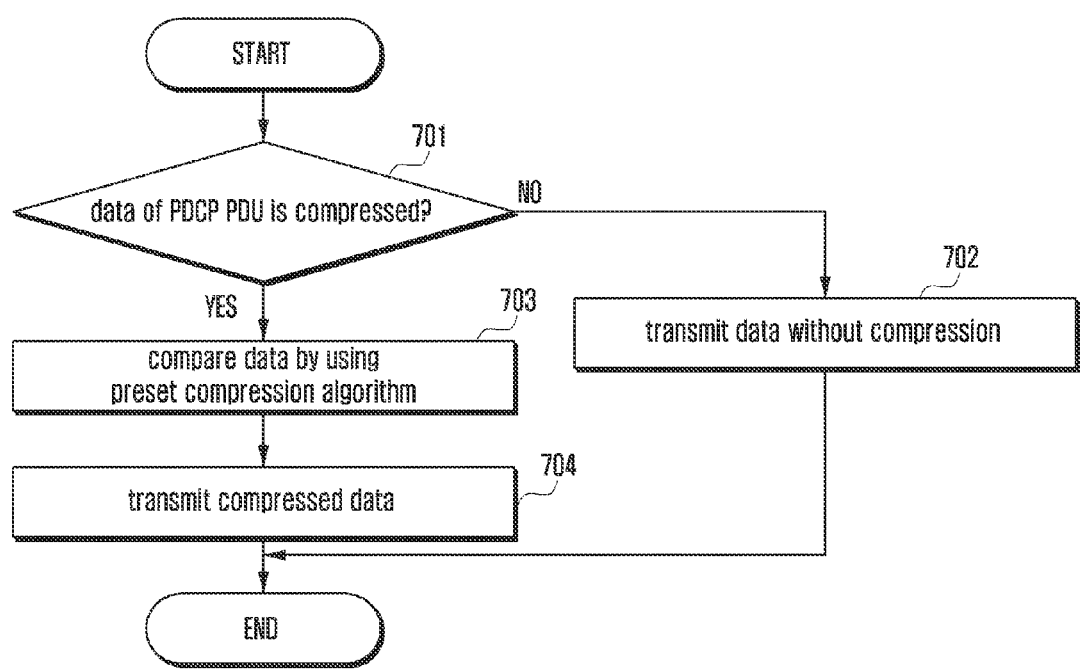
FIG. 7 is a flowchart illustrating a data transmission method according to embodiment of the present disclosure.

FIG. 7 is a flowchart illustrating a data transmission method according to an embodiment of the present disclosure.

In operation 701, an eNB may first determine whether to compress data of the PDCP PDU. For example, when a final receiving side of the PDCP PDU is the MTC device, the eNB may determine to compress the data of the PDCP PDU. However, the case where the eNB determines to compress the data of the PDCP PDU is not limited thereto. In wireless communication with the UE, the eNB may process data according to an LTE protocol and compress a payload part including data, which is not the header, with respect to the PDCP PDU. Whether to compress the PDCP PDU may be different according to the type of reception UE. When the PDCP PDU is not compressed, only the header may be compressed, only the ciphering and integrity protection operations may be performed, and transmission to the RLC is made in operation 702.

When it is determined to compress the data of the PDCP PDU, the data part of the PDCP PDU may be compressed using a preset compression algorithm in operation 703. At this time, the preset compression algorithm may use various data compression algorithms.

The present disclosure proposes a method of compressing the data part of the PDCP PDU, that is, the payload part except for the header.

The principle of the data compression corresponds to identification of a data stream pattern. That is, the data compression refers to selection of a more effective method of expressing the same information. Accordingly, application of the data compression algorithm to data is to remove as much duplication as possible. The efficiency and utility of a compression scheme may be measured by a compression ratio, that is, a ratio of the size of a part, which is not compressed, to the size of a compressed part. In general, the compression ratio of 2:1 means that the compressed data is half of the original data.

There are many algorithms that can be used for compressing data. Some algorithms are designed to use a particular medium and redundancies within the algorithm. However, when the algorithm is applied to a different type of data, which does not correspond to the particular medium and redundancies, the effect significantly deteriorates.

For example, a Motion Picture Experts Group (MPEG) standard is designed to use relatively small differences between one frame and another frame within video data. Accordingly, a high performance is exhibited when the MPEG standard is applied to a dynamic image, but not when the MPEG standard is applied to text.

In a data compression theory, the most important thing is that there is a theoretical threshold which has been known as the Shannon limit. The Shannon limit informs of how much given source data can be compressed. When the Shannon limit is exceeded, it is impossible to reconstruct the compressed data. Current compression algorithms may have approached the Shannon limit through a high speed processor, but cannot exceed the limit.

Data compression of layer 2 may refer to compression of the payload part of a wireless access network (WAN) protocol of layer 2. The WAN protocol may correspond to one of PPP, Frame Relay, high-level data link control (HDLC), X.25, and link access procedure, balanced (LAPB). The header part of layer 2 is not included in a target to be compressed. However, a total payload data part including the header of the higher layer protocol may be compressed. There is no limit on the algorithm used for compressing data, but one of a Stacker algorithm and a Predictor algorithm may be used.

The data compression proposed by the present disclosure shows a greatly high compression rate in a case of text type data. Particularly, the use of compressed data by the MTC gateway may provide a higher gain as the number of MTC devices increases.

In operation 704, the compressed data may be transferred to the RLC.

Figure 8:
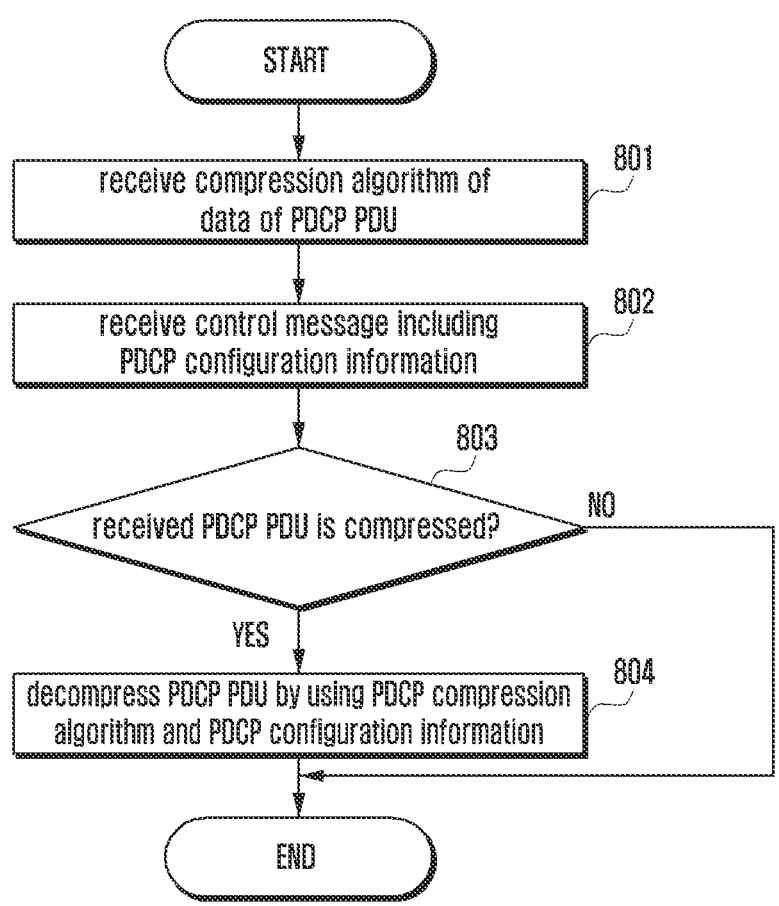
FIG. 8 is a flowchart illustrating a data reception method according to embodiment of the present disclosure.

FIG. 8 is a flowchart illustrating a data reception method according to an embodiment of the present disclosure.

A reception device receives information on an algorithm used for compressing data of the PDCP PDU from a transmission device in advance in operation 801.

Then, the reception device may receive a control message including PDCP configuration information in operation 802. The reception device may receive one control message including all of information on the algorithm used for compressing the data of the PDCP PDU and the PDCP configuration information, or receive each of the control message including the information on the algorithm used for compressing the data of the PDCP PDU and the control message including the PDCP configuration information.

The PDCP configuration information may include one or more parameters indicating whether the data of the PDCP PDU is compressed. More specifically, the PDCP configuration information may include at least one piece of information indicating whether the PDCP PDU received by the reception device is compressed, a maximum context index (macCID) information, and at least one profile address supporting the data compression algorithm.

Further, the control message and the information on the compression algorithm of the PCDP PDU data may be transmitted through RRC signaling.

According to the PDCP configuration information, whether the received PDCP PDU is compressed is determined in operation 803. When the PDCP PDU is not compressed, the PDCP PDU may be processed according to the PCDP PDU processing process according to the related art. When the PDCP PDU is compressed based on the PDCP configuration information, decompression may be performed using the received information on the compression algorithm of the PDCP PDU and PDCP configuration information in operation 804.

Figure 9:
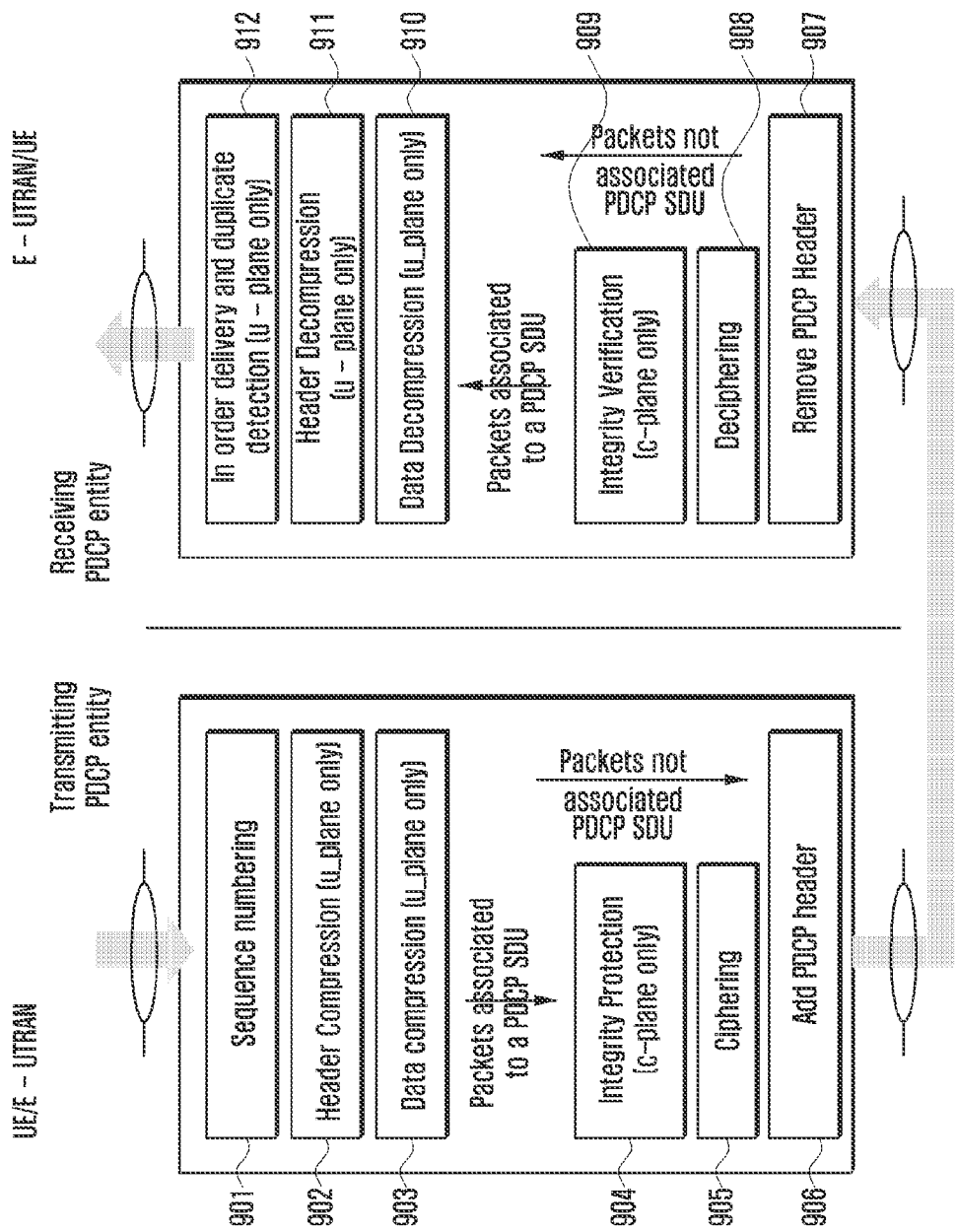
FIG. 9 illustrates a data flow in the PDCP entity when a data transmission/reception method according to an embodiment of the present disclosure.

FIG. 9 illustrates a data flow in the PDCP entity when a data transmission/reception method according to an embodiment of the present disclosure.

Although it is assumed that data transmission is performed from an eNB or E-UTRAN to a UE for convenience in FIG. 9 like in FIG. 6, the same process may be executed when the data transmission is inversely performed from the UE to the eNB or E-UTRAN.

The data flow of FIG. 9 is the same as the data flow in the PDCP entity of FIG. 6 except for addition of a data compression module in FIG. 9, and a description of operations common to both FIG. 6 and FIG. 9 will therefore not be repeated. That is, the PDCP performs sequence numbering on data to be transmitted in operation 901. Then, the PDCP may selectively perform IP header compression in operation 902. The header compression may be based on ROHC. After the header compression, the data of the PDCP PDU may be compressed according to the present disclosure in operation 903. After the data compression, the PDCP performs integrity protection only for a control plane in operation 904. More specifically, a packet associated with the PDCP SDU may perform the integrity protection, and a packet, which is not associated with the PDCP SDU, may not pass through the integrity protection process.

In operation 905, the PDCP enciphers the data packet. In operation 906, after a PDCP header containing information required for deciphering by the UE is added, an output of the PDCP is input into the RLC.

Although not illustrated in FIG. 9, the following data flow is described below.

The RLC protocol performs segmentation and/or concatenation of the PDCP SDU and, subsequently, adds the RLC header. The header is used for identifying the RLC PDU when the UE performs data transmission and re-transmission according to the order. RLC PDUs are transmitted to a MAC layer, and several RLC PDUs are combined into one MAC SDU and then the MAC header is added to form a transport block. The size of the transport block may vary depending on an instantaneous data rate selected by link adaptation. Lastly, a PHY layer adds a CRC to the transport block for the purpose of error detection, performs coding and modulation, and then transmits a final signal with radio waves.

The UE having received the transport block inversely performs the above described process. More specifically, the output of the RLC of the reception UE is input into the PDCP. The PDCP removes the PDCP header in operation 907. Further, the PDCP may perform deciphering and integrity verification in operations 908 and 909. Like the transmitting side PDCP layer, packets, which are not associated with the PDCP SDU, may directly perform a data decompression operation without performing the integrity verification operation in operation 910. After the data decompression, a header decompression operation may be performed in operation 911. Thereafter, the PDCP may perform duplicate detection of lower layer SDUs in operation 912.

Figure 10:
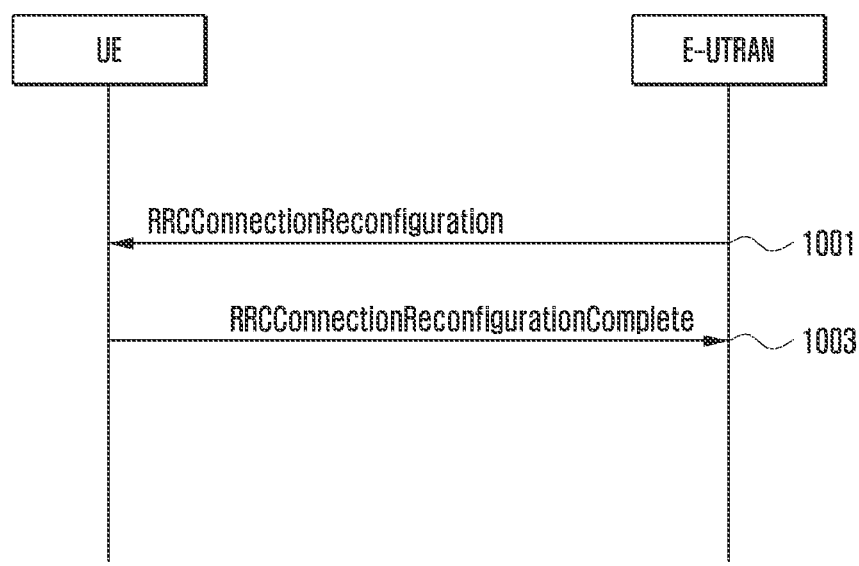
FIG. 10 illustrates a method of transmitting data related to a compression algorithm of data of a PDCP protocol data unit (PDU) according to an embodiment of the present disclosure.

FIG. 10 illustrates a method of transmitting data related to a compression algorithm of data of the PDCP PDU according to an embodiment of the present disclosure.

The E-UTRAN in FIG. 10 may refer to an LTE cellular network and may communicate with the UE through an eNB. The eNB may transmit an RRCConnectionReconfiguration message to the UE in operation 1001. The RRCConnectionReconfiguration message transmitted to the UE by the eNB may include information related to an algorithm used for compressing the data of the PDCP PDU according to an embodiment of the present disclosure.

When the UE receives the RRCConnectionReconfiguration message from the eNB, the UE may transmit an RRCConnectionReconfigurationComplete message as a response to the RRCConnectionReconfiguration message in operation 1003.

The RRCConnectionReconfigurationComplete message transmitted to the eNB, that is, E-UTRAN by the UE may include information on a compression algorithm of the data of the PDCP PDU transmitted to the eNB by the UE.

Figure 11:
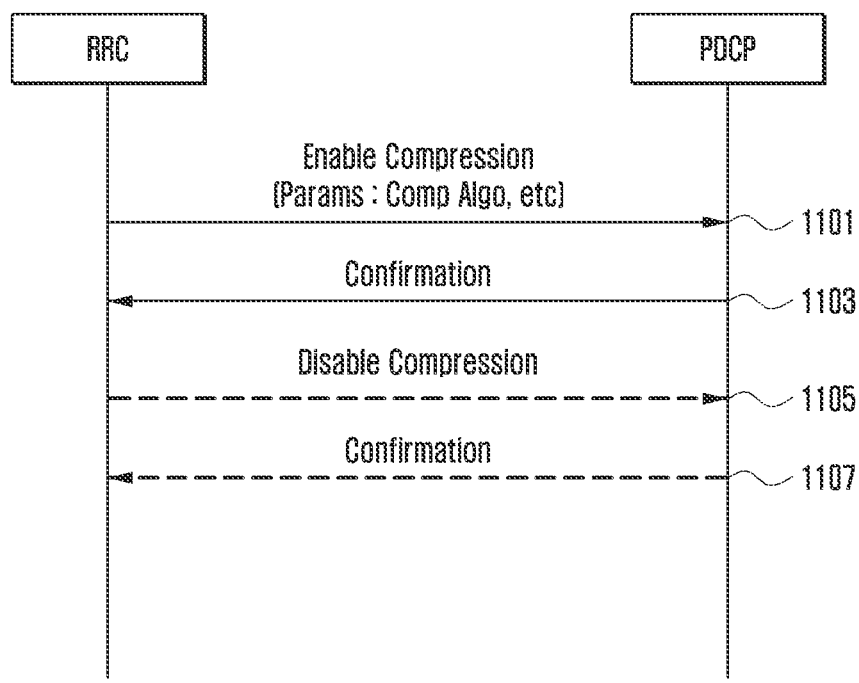
FIG. 11 illustrates a message flow for determining whether to compress data of a PDCP PDU in a data transmission/reception method according to an embodiment of the present disclosure.

FIG. 11 illustrates a message flow for determining whether to compress data of a PDCP PDU in a data transmission/reception method according to an embodiment of the present disclosure.

Referring to FIG. 11, an RRC may trigger whether to compress a data part of the PDCP PDU to the PDCP layer.

In operation 1101, the RRC may transmit a message indicating data compression of the PDCP PDU to the PDCP layer. Parameters included in the control message may include an algorithm used for compression and various algorithms may be used.

In operation 1103, the PCDP may transmit a response to a compression activation message of the RRC.

When the compression of the data of the PDCP PDU is deactivated, the RRC may transmit a disable compression message to not compress the data of the PDCP PDU in operation 1105.

In this case, the PDCP may transmit a response (confirmation) thereto, in operation 1107, as described in operation 1103.

FIG. 12 illustrates PDCP configuration information included in a control message in a data transmission/reception method according to an embodiment of the present disclosure.

Referring to FIG. 12, PDCP configuration information may be divided into parts indicating header compression and data compression, and each of the parts may include at least one piece of information indicating whether a PDCP PDU transmitted/received by a communication device according to the present disclosure is compressed, maximum context index (maxCID) information which can be used by the communication device, and at least one profile address supporting a data compression algorithm.

Figure 13:
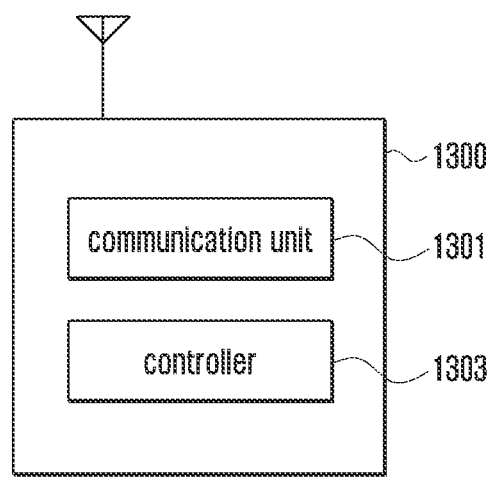
FIG. 13 is a block diagram illustrating a configuration of a data transmission/reception device according to an embodiment of the present disclosure.

FIG. 13 is a block diagram illustrating a configuration of a data transmission/reception device according to an embodiment of the present disclosure.

Referring to FIG. 13, a data transmission/reception device 1300 to which an embodiment of the present disclosure can be applied may include a communication unit 1301 and a controller 1303. Although FIG. 13 illustrates only the communication 1301 and the controller 1303, it is noted that a plurality of separate configurations may be designed according to selection of an implementer.

The communication unit 1301 may perform wired or wireless data communication. A communication scheme which can be performed by the communication unit 1301 is not limited to any one scheme, and not only a cellular network but also a local access type connection can be used.

The controller 1303 may receive a control message including PDCP configuration information from an external communication device, determine whether data of a PDCP PDU received by the communication device is compressed according to the received PDCP configuration information, and, when the data is compressed based on a result of the determination, decompress the data.

Further, the controller 1303 may determine data compression with respect to the PDCP PDU of data to be transmitted, compress the data of the PDCP PDU according to a preset compression algorithm, and transmit the compressed data to the external communication device.

In addition, before determining the data compression with respect to the PDCP PDU of data to be transmitted, the controller 1303 may transmit a control message including information related to the preset compression algorithm and PDCP configuration information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of receiving data by a user equipment (UE) in a wireless communication system, the method comprising:
receiving, from a base station, a control message including packet data convergence protocol (PDCP) configuration information, the PDCP configuration information indicating whether data of a PDCP protocol data unit (PDU) is compressed;
determining whether the data of the PDCP PDU is compressed according to the PDCP configuration information; and
when the data is compressed based on a result of the determination, decompressing the data,
wherein it is determined whether the data of the PDCP PDU is compressed according to a type of the UE.

2. The method of claim 1, wherein the PDCP configuration information includes at least one of information indicating whether the PDCP PDU is compressed, maximum context index (maxCID) information, and at least one profile address supporting a compression algorithm of the data.

3. The method of claim 1, wherein the control message is received through a radio resource control (RRC) signal.

4. The method of claim 1, further comprising, before receiving of the control message including the PDCP configuration information, receiving, from the base station, information on a compression algorithm of the PDCP PDU.

5. The method of claim 4, wherein the information on the compression algorithm is received through an RRC signal.

6. A method of transmitting data by a base station in a wireless communication system, the method comprising:
determining whether to compress data of a packet data convergence protocol (PDCP) protocol data unit (PDU) according to a type of a user equipment (UE);
compressing the data of the PDCP PDU according to a preset compression algorithm;
transmitting, to the UE, the compressed data; and
transmitting, to the UE, PDCP configuration information indicating the data of the PDCP PDU is compressed.

7. The method of claim 6, further comprising, transmitting, to the UE, a control message including information on the preset compression algorithm.

8. The method of claim 6, wherein the PDCP configuration information includes at least one of information indicating whether the PDCP PDU is compressed, maximum context index (maxCID) information, and at least one profile address supporting a compression algorithm of the data.

9. The method of claim 7, wherein the information on the compression algorithm and the control message are transmitted to the UE through a radio resource control (RRC) signal.

10. A user equipment (UE) for transmitting and receiving data in a wireless communication system, the UE comprising:
a transceiver; and
a controller coupled with the transceiver and configured to:
receive, from a base station, a control message including packet data convergence protocol (PDCP) configuration information, the PDCP configuration information indicating whether data of a PDCP protocol data unit (PDU) is compressed,
determine whether the data of the PDCP PDU is compressed according to the PDCP configuration information, and
when the data is compressed based on a result of the determination, decompress the data,
wherein it is determined whether the data of the PDCP PDU is compressed according to a type of the UE.

11. The UE of claim 10, wherein the PDCP configuration information includes at least one of information indicating whether the PDCP PDU is compressed, maximum context index (maxCID) information, and at least one profile address supporting a compression algorithm of the data.

12. The UE of claim 10, wherein the control message is received through a radio resource control (RRC) signal.

13. The UE of claim 10, wherein the controller is configured to receive information on a compression algorithm of the PDCP PDU from the base station before receiving the control message including the PDCP configuration information.

14. The UE of claim 13, wherein the information on the compression algorithm is received through an RRC signal.

15. A base station for transmitting and receiving data in a wireless communication system, the base station comprising:
   a transceiver; and
   a controller coupled with the transceiver and configured to:
      determine whether to compress data of a packet data convergence protocol (PDCP) protocol data unit (PDU) according to a type of a user equipment (UE),
      compress the data of the PDCP PDU according to a preset compression algorithm,
      transmit, to the UE, the compressed data, and
      transmit, to the UE, PDCP configuration information indicating the data of the PDCP PDU is compressed.

16. The base station of claim 15, wherein the controller is configured to transmit a control message including information on the preset compression algorithm.

17. The base station of claim 16, wherein the PDCP configuration information includes at least one of information indicating whether the PDCP PDU is compressed, maximum context index (maxCID) information, and at least one profile address supporting a compression algorithm of the data.

18. The base station of claim 16, wherein the information on the compression algorithm and the control message are transmitted to the UE through a radio resource control (RRC) signal.

* * * * *